Feb. 25, 1969     J. R. HARKNESS     3,429,533
VIBRATION ABSORBING MOUNTING FOR SINGLE-CYLINDER
VERTICAL SHAFT ENGINE
Filed Oct. 23, 1967

Joseph R. Harkness

United States Patent Office 3,429,533
Patented Feb. 25, 1969

3,429,533
VIBRATION ABSORBING MOUNTING FOR SINGLE-CYLINDER VERTICAL SHAFT ENGINE
Joseph R. Harkness, Germantown, Wis., assignor to Briggs & Stratton Corporation, Milwaukee, Wis., a corporation of Delaware
Filed Oct. 23, 1967, Ser. No. 677,463
U.S. Cl. 248—9        7 Claims
Int. Cl. E02d 27/44; F16m 1/04; F16f 15/04

ABSTRACT OF THE DISCLOSURE

The engine mounting is annular and comprises a frustoconical outer wall, the rim portion of which is rigidly secured to engine carrying structure, and a concentric inner tube, to the top of which the engine is secured. The crankshaft extends through the tube and carries a rotation transmitting member downwardly adjacent to the bottom of the mounting member. The mounting confines vibratory engine motion to swinging about the point where the plane of its bottom intersects the crankshaft axis so that the rotation transmitting member remains practically stationary. Resilient snubbers prevent excessive engine motion.

---

Figure 1:
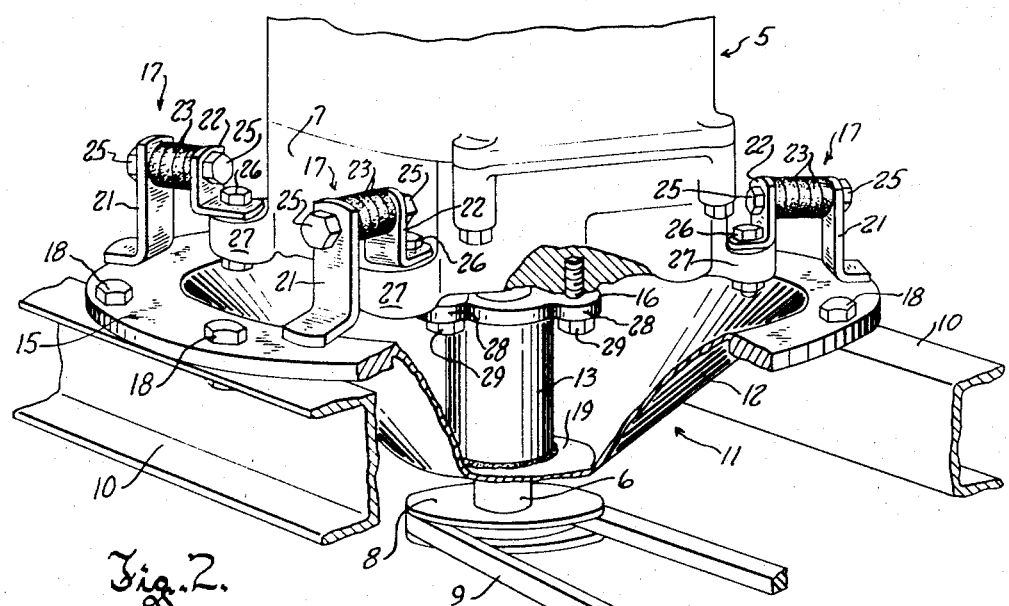

This invention relates to vibration absorbing mountings for reciprocating engines and pertains more specifically to a vibration absorbing mounting for a single-cylinder engine of the type having a vertical crankshaft.

Single-cylinder engines are used on a variety of farm, estate and garden machines such as lawn mowers, riding tractors, snow plows and the like. In most such installations the engine has heretofore been rigidly mounted on the machine, so that the machine as a whole was caused to partake of all of the vibration of the engine.

Vibration is almost always undesirable in an engine powered machine because it causes loosening of bolts and nuts, promotes frictional wear of contiguous parts that can slide or rub on one another, induces fatigue in metal parts that are subject to flexing or fluttering, and causes mechanical troubles and failures in other familiar ways. A solid or rigid engine mounting is additionally undesirable in a riding tractor, riding mower or similar machine upon which an operator is carried because the vibration of the engine, imposed upon the machine through the rigid engine mounting and transmitted to the operator through the seat, steering gear, foot rests and the like, can cause severe discomfort to the operator, especially during a prolonged period of operation. Vibration is especially severe in a machine that is lightly built, since the vibratory motion of a machine is inversely proportional to its mass.

It has long been recognized that it would be desirable to use "soft" mounting means for supporting a single-cylinder engine on a machine of the character described; or in other words, it has been known that it would be preferable to employ a mounting that would permit the engine to have yieldingly restrained freedom for motion relative to the machine, so that the vibrations of the engine would, in effect, be isolated from the rest of the machine.

However, such a "soft" mounting for a single-cylinder engine has not heretofore been considered feasible, especially for an engine having its crankshaft oriented vertically, because the "soft" engine mounts heretofore available would have interfered with power transmission. Usually when a vertical crankshaft engine is installed on a riding tractor, riding mower or the like, a drive pulley on the lower end portion of the engine crankshaft is drivingly connected with an input pulley on the machine by means of a belt that is trained around the two pulleys. If bodily vibratory motion of the engine were allowed to produce a corresponding motion of the drive pulley, belt tension would of course be lost.

As between the supposed alternatives of very inefficient power transmission and vibration of the whole machine, the choice has heretofore been made in favor of a rigid engine mounting to obtain efficient utilization of available engine power, and vibration of the machine has been accepted as inevitable.

The present invention offers a way out of this apparent dilemma in that its general object is to provide a "soft" mounting for a single cylinder engine whereby the engine is permitted to have a substantial amount of yieldingly restrained freedom for bodily motion relative to a machine on which it is mounted, so that the vibrations of the engine are isolated from the machine, but whereby substantially all vibratory motion of the engine is caused to take place about a point that is on the axis of the engine crankshaft and substantially on the plane of a drive pulley or the like by which the crankshaft is connected with engine driven mechanism, so that such motion of the engine does not affect the connection between the engine and the mechanism that it drives.

Another object of the invention is to provide a simple, sturdy and very inexpensive vibration absorbing engine mount for a single-cylinder engine having a vertical crankshaft, whereby the engine is allowed to have limited yieldingly resisted vibratory motion so that its vibration is isolated from a machine upon which it is mounted rather than being transmitted thereto, but whereby a drive pulley or the like on the engine crankshaft is maintained substantially immobilized so that such vibratory motion of the engine cannot interfere with a motion transmitting connection between the engine and driven means on the machine by which the engine is carried.

Another object of this invention is to provide vibration absorbing engine mounting means of the character described that is adaptable for cooperation with the mounting pads and the like that have become conventional and standard on the single-cylinder vertical crankshaft engines for which the engine mount of this invention is particularly intended.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

Figure 2:
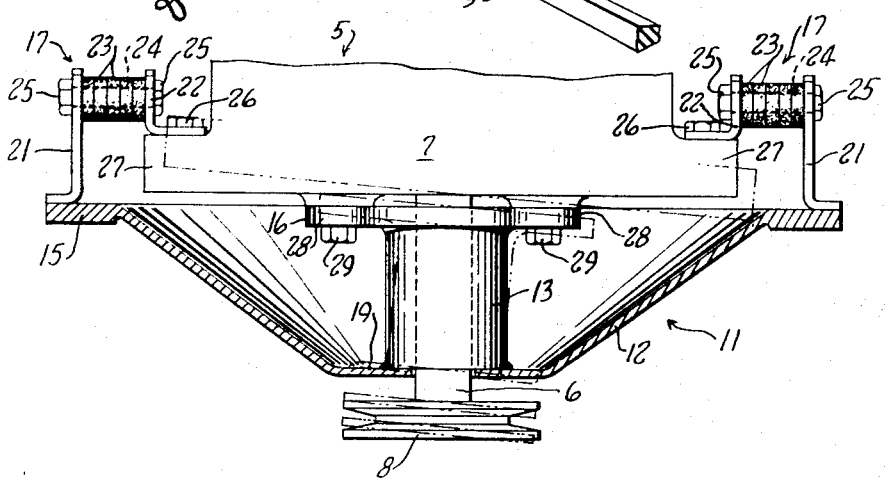

The drawing illustrates one complete example of the physical embodiment of the invention constructed according to the best mode so far devised for the practical application of the principles thereof, and in which:

FIGURE 1 is a fragmentary perspective view, with portions broken away, of engine mounting structure embodying the principles of this invention; and FIGURE 2 is a fragmentary vertical sectional view of the engine mounting structure shown in FIGURE 1.

Referring now to the accompanying drawing, the numeral 5 designates generally a single-cylinder vertical crankshaft internal combustion engine such as is widely used on lawn mowers, including riding mowers, and is being increasingly used on riding tractors and similar machines. The crankshaft 6 of such an engine projects downwardly from the crankcase portion 7 of the engine body and has at its bottom a power transmission member 8 that can comprise a drive pulley around which is trained an endless belt 9.

The tractor or other machine on which the engine is installed has a rigid frame or engine carrying structure which is illustrated as comprising a pair of sills 10 that are fixed parallel relationship to one another. The mounting 11 by which the engine 5 is supported on the sills is, in general, an annular member comprising a downwardly dished frustoconical outer wall 12 and a concentric rigid tube 13 that projects upwardly from the bottom of said outer wall. The frustoconical outer wall 12 of the engine mounting has a rim portion 15 which is substantially rigid and which is secured to the sills 10; and the tube 13 has means 16 at its top by which the engine is secured thereto, the engine being otherwise free and clear of the outer wall 12. Snubbers 17 connected between the engine crankcase 7 and the engine carrying structure of the machine serve to limit motion of the engine relative to the sills 10.

The rim portion 15 of the annular mounting member is illustrated as comprising a rather wide radially outwardly projecting flange that is integral with the frustoconical outer wall 12 and extends around the upper edge thereof. Diametrically opposite portions of this flange flatwise overlie the sills 10 and are anchored to them by means of bolts 18.

Although shown as truly frustoconical, the outer wall 12 of the engine mounting could be somewhat bowl-shaped (that is, curved as seen in section), or it could be convoluted. It should in any event be downwardly convergent and should be substantially circular at every plane normal to its axis so that it is substantially unyielding to torsional forces about its axis and to forces along its axis but is resiliently yieldable to forces transverse to its axis. The largest diameter of the outer wall 12, at its rim, is of course somewhat greater than the widest dimension of the engine crankcase 7.

The frustoconical outer wall can have an integral bottom portion 19 that is flat and has an outside diameter somewhat greater than that of the tube 13 so as to provide, in effect, a diaphragm connection between the tube and the downwardly convergent portion of the outer wall.

The tube 13 has an inside diameter such that the crankshaft can extend therethrough with some clearance, and its height is about equal to the axial depth of the frustoconical outer wall, so that the engine is supported on the tube with the bottom of its crankcase 7 at about the level of the rim portion 15. The engine securement means 16 at the top of the tube can comprise a substantially annular flange that is welded or otherwise secured to the tube, having lugs 28 through which bolts 29 can extend into suitably threaded downwardly opening holes in the bottom of the crankcase.

The tube can be made as a separate member that rests on the bottom wall or diaphragm 19, in which case it must be firmly secured thereto, as by being welded or otherwise bonded thereto all around its bottom edge; or the tube can be formed as an integral upwardly reverted portion of the frustoconical outer wall. In any case the connection between the tube and the outer wall must be substantially unyielding to torsional forces about the axis of the annular mounting member and to thrust forces along its axis, but must transmit to the outer wall the vibration forces in directions transverse to the axis of the mounting member which the engine exerts upon the top of the tube, so that the outer wall will flex in response to such forces.

The tube 13 is by its nature substantially rigid in all directions. It will be apparent that under vibration the engine and the tube will swing or rock as a unit about the point that is defined by the intersection of the crankshaft axis with the plane of the diaphragm portion 19, and that the outer wall will flex to accommodate and yieldingly resist such motion. Because the point about which such rocking and swinging motion take place is very close to the drive pulley 8, the latter undergoes almost no bodily motion as the engine thus moves in response to its vibration producing forces. The slight tilting of the pulley in consequence of such bodily engine motion (which is indicated by broken lines in FIGURE 2) cannot materially affect tension of the belt 9.

Of course there is a substantially long moment arm between the point just mentioned and the situs of the vibration producing forces, so that the vibratory motion of the engine can have a substantial amplitude. At normal engine operating speeds the amplitude of such engine motion has been found adequate to prevent transfer of most of the engine vibration to the sills 10, so that the machine on which the engine is carried partakes of very little of its vibration. At certain lower engine speeds, the frequency of dominant modes of engine vibration may be in resonance with the natural frequency of the annular mounting member, but the snubbers 17 prevent excessive motion of the engine relative to the frame under these conditions.

Each snubber comprises a pair of L-shaped brackets 21 and 22, which can be substantially rigid, and a plurality of elastomeric washers or rings 23 that are confined between the opposing upright arms of the brackets. One bracket 21 of each pair is secured, as by welding, to the rim portion 15 of the mounting member and projects upwardly therefrom, which the other bracket 22 is secured to the engine crankcase, preferably by means of a bolt 26 that fastens it to the upper surface of one of the mounting pads 27 that is more or less conventionally present on the bottom of the crankcase of a vertical shaft engine. The pairs of brackets are arranged at substantially uniform circumferentially spaced intervals around the crankcase.

A rod 24, having heads 25 at its opposite ends, extends through axially aligned holes in the upright arms of each pair of brackets 21 and 22 and through the elastomeric washer elements 23 to keep them axially confined between the upright arm of the brackets. The elastomeric washer elements 23 can be of rubber, neoprene or the like, and they are of course yieldable in compression to permit their associated brackets to have a certain amount of resiliently restrained freedom of relative motion in directions both parallel and transverse to the rod 24.

In addition to prevent excessive motion of the engine in response to vibration, the snubbers tend to prevent permanent deformation of the outer wall of the mounting member in case a substantial force is applied to the engine, as when unusual force is applied to a rope starter or in the event of a collision.

From the foregoing description taken with the accompanying drawing it will be apparent that this invention provides a so-called soft mounting for a single-cylinder vertical crankshaft engine whereby the engine is permitted to have yieldingly restricted bodily movement relative to a machine or the like on which the engine is carried, so that the machine is substantially isolated from the vibrations of the engine, but whereby drive member on the engine crankshaft is maintained in a substantially fixed position relative to the rest of the machine despite such bodily engine motion so that there can be no interference with a driving connection between the engine and the machine that it powers.

What is claimed as my invention is:

1. Vibration absorbing mounting means for a single-cylinder internal combustion engine having a vertical crankshaft that projects downwardly from the engine crankcase and on the bottom of which there is a rotation transmitting member, by which mounting means the engine is supported on substantially rigid structure of a machine to be powered by the engine, said mounting means comprising:

(A) an annular member comprising
    (1) a substantially frustoconical downwardly dished outer wall, and
    (2) a concentric tube securely connected to and projecting upwardly from the bottom of the outer wall;

(B) means on the upper marginal edge portion of the outer wall for securing the annular member to machine structure; and (C) means on the top of said tube by which the same can be rigidly connected to the bottom of an engine crankcase with the crankshaft extending substantially concentrically through the tube and with the rotation transmitting member downwardly adjacent to the bottom of the annular member.

2. The vibration absorbing mounting means of claim 1, further characterized by:

a plurality of resilient snubbers, each having (1) means for connecting one part of the snubber with the crankcase of an engine on the annular member, and (2) means for connecting another part of the snubber in fixed relation to the upper marginal edge portion of the outer wall of the annular member, said snubbers being in circumferentially spaced relation to one another.

3. A vibration absorbing mounting for a single-cylinder internal combustion engine of the type having a vertical crankshaft that projects below the bottom of the crankcase of the engine and carries at its bottom a rotation transmitting member connecting with mechanism to be driven, said mounting comprising:

(A) a substantially frustoconical bowl-like member having (1) means on its rim portion for securement to machine structure on which the engine is to be mounted, and (2) having a substantially coaxial hole in its bottom wall through which the engine crankshaft can project; and (B) a substantially rigid tube coaxially secured to the bottom wall of said bowl-like member and projecting upwardly therefrom, said tube having means at its top providing for securement to the engine crankcase with the crankshaft extending therethrough and the rotation transmitting member downwardly adjacent to the bottom wall of the bowl-like member, the engine being otherwise free of the frustoconical member so that the engine can flex the frustoconical member to swing in vibration in all directions about a point defined by the intersection of the crankshaft axis with the plane of said bottom wall, which point is so close to the motion transmitting member that the same has only negligible motion in consequence of such engine swinging.

4. A vibration absorbing mount for a single-cylinder internal combustion engine of the type having a vertical crankshaft that projects below the bottom of the crankcase of the engine and has at its bottom a rotation transmitting member connectable with mechanism to be driven, said engine mount comprising:

(A) a substantially rigid tube having its top rigidly secured to the bottom of the engine crankcase with the tube substantially coaxially surrounding the downwardly projecting portion of the crankshaft, the height of said tube being such that the rotation transmitting member is spaced slightly below its bottom; and (B) means for supporting the tube from a machine to be powered by the engine in a manner that permits resiliently restricted swinging motion of the top of the tube in all directions about a point on the crankshaft axis which is in the plane of the bottom of the tube and is therefore close to the rotation transmitting member, said supporting means comprising (1) a substantially deeply dished annular member having a rim portion and a diaphragm-like annular bottom wall portion to which the bottom of said tube is coaxially secured, the outside diameter of said bottom wall portion being substantially larger than that of the tube to provide for flexing of the bottom wall portion, and (2) means for rigidly securing the rim portion of the annular member to a machine to be powered by the engine.

5. The engine mount of claim 4 further characterized by:

a plurality of resilient snubbers, each having a connection with the crankcase of the engine and a connection with the rim portion of the dished member, said snubbers being located at circumferentially spaced intervals around the dished member.

6. The engine mount of claim 5, further characterized by:

(A) a plurality of brackets, one for each of said snubbers, each secured to the rim portion of the dished member and projecting upwardly therefrom to provide the connection of the snubber with the dished member; and (B) the connections of the snubbers with the engine crankcase being at a level above the top of the tube.

7. The engine mount of claim 5, further characterized by:

said bottom wall portion of the dished annular member being substantially flat.

References Cited

UNITED STATES PATENTS

| | | | |
|---|---|---|---|
| 1,384,169 | 7/1921 | Theberath | 248—3 XR |
| 1,901,474 | 3/1933 | Rodgers | 248—26 |
| 1,978,158 | 10/1934 | Kroenlein | 248—26 XR |
| 3,235,049 | 2/1966 | Hufstader. | |

JOHN PETO, *Primary Examiner.*

U.S. Cl. X.R.

248—22; 267—1